(12) United States Patent
Konigsburg et al.

(10) Patent No.: US 6,279,105 B1
(45) Date of Patent: Aug. 21, 2001

(54) PIPELINED TWO-CYCLE BRANCH TARGET ADDRESS CACHE

(75) Inventors: Brian R. Konigsburg; David Stephen Levitan, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/173,039

(22) Filed: Oct. 15, 1998

(51) Int. Cl.[7] .................................................. G06F 13/00
(52) U.S. Cl. ........................ 712/238; 712/239; 712/240
(58) Field of Search ..................................... 711/125, 213; 712/200, 205, 207, 233, 237, 238, 239, 240

(56) References Cited

U.S. PATENT DOCUMENTS

| | | | |
|---|---|---|---|
| 5,515,518 | * | 5/1996 | Stiles et al. ........................... 712/239 |
| 6,067,616 | * | 5/2000 | Stiles et al. ........................... 712/239 |

* cited by examiner

*Primary Examiner*—Robert B. Harrell
(74) *Attorney, Agent, or Firm*—Kelly K. Kordzik; Winstead Sechrest & Minick P.C.; Anthony V. S. England

(57) ABSTRACT

In a branch instruction target address cache, an entry associated with a fetched block of instructions includes a target address of a branch instruction residing in the next sequential block of instructions. The entry will include a sequential address associated with the branch instruction and a prediction of whether the target address is taken or not taken.

16 Claims, 7 Drawing Sheets

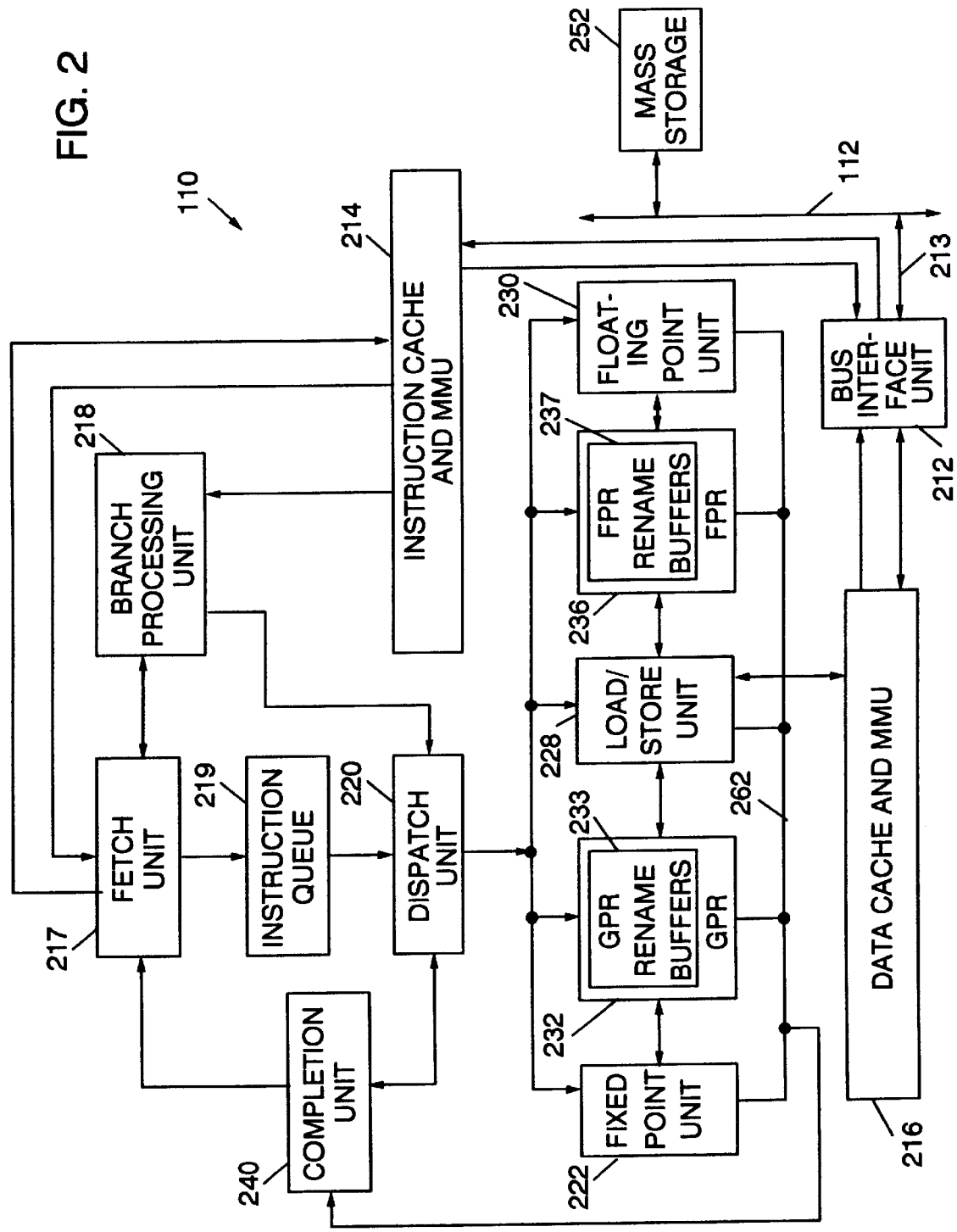

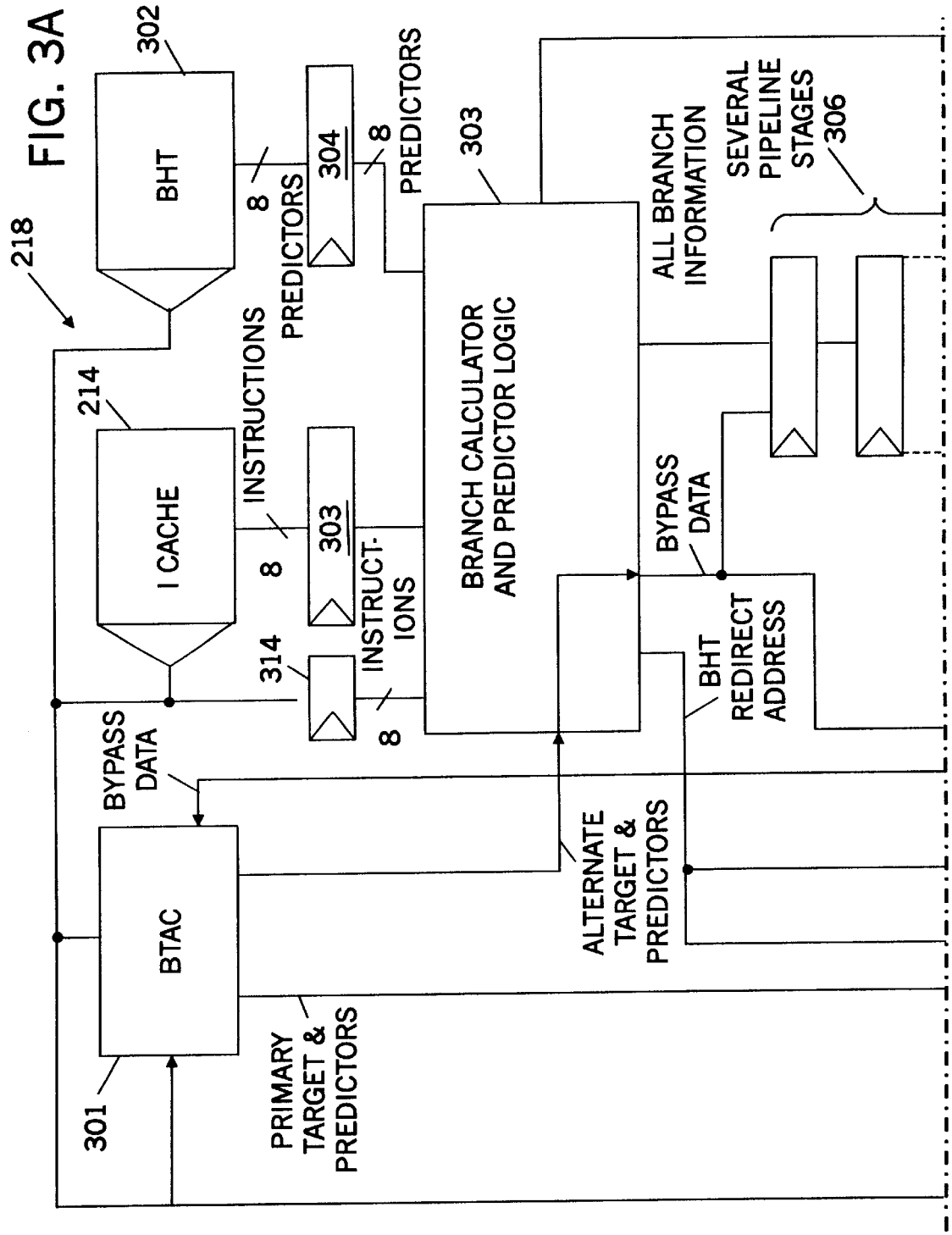

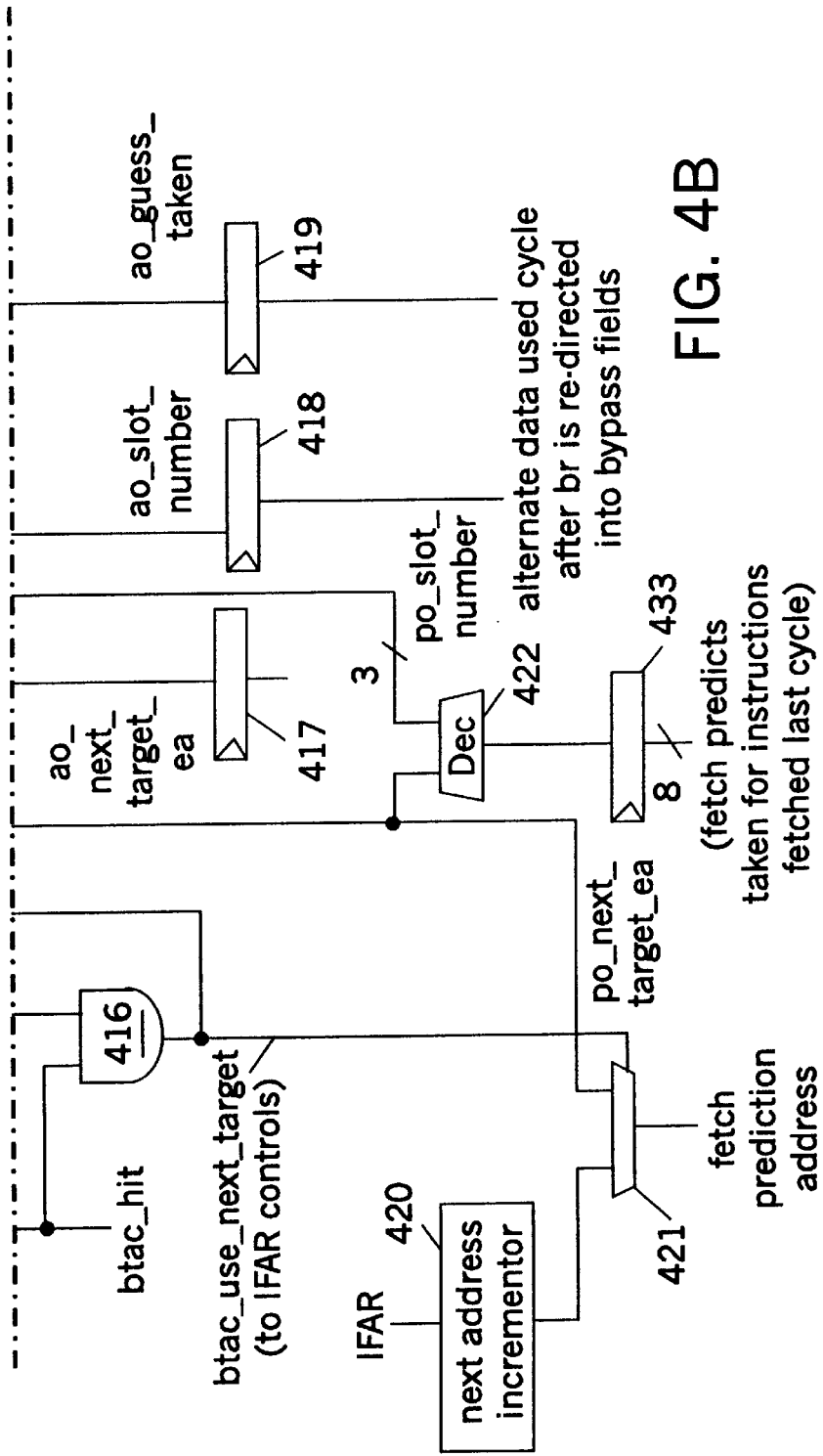

PIPELINED TWO-CYCLE BRANCH TARGET ADDRESS CACHE

TECHNICAL FIELD

The present invention relates in general to data processing systems, and in particular, to the processing of branch instructions within a microprocessor.

BACKGROUND INFORMATION

In superscalar microprocessor architectures, branch instructions are executed by a separate branch processing unit in order to predict whether a particular branch instruction will be taken or not. Typically, such predictions are based on past performance pertaining to that particular branch instruction. This is implemented using a branch history table, which records such past performances.

Branch prediction improves the efficiency and speed by which instructions are executed within a microprocessor by fetching ahead of time the instructions predicted to be executed. Without branch prediction, the microprocessor would have to wait until the branch instruction was actually executed and the resultant target address calculated within one of the execution units before being able to fetch the instructions lying along the taken branch. The processor would then stall waiting for those instructions to be fetched from memory.

One type of branch prediction circuitry utilized within the branch processing unit is a branch target address cache ("BTAC"), which is a history table that associates a branch's target address with the branch instruction's address. Without a BTAC, each taken branch must be processed after it is fetched before the subsequent instructions are fetched. This normally causes at least a one cycle delay in the instruction fetch pipeline. In a standard BTAC, the BTAC is read in parallel with the instruction cache, and if there is data in the BTAC, then the address in the BTAC is used to feed the instruction cache and BTAC in the next cycle. If there is no data found in the BTAC (BTAC miss), then the sequential address is selected. This standard BTAC approach causes a limit to cycle time because it must be determined if there is a hit in the BTAC, and that hit indication must then be used to select the instruction cache address for the next cycle.

If the BTAC is made to be direct mapped (or set associative with a way prediction) and the address from the BTAC is always used, then much of the cycle time problems of a BTAC are solved. Such a solution requires that "not taken" branches be added to the BTAC, and has the following problems:

(1) "Not taken" branches must be included in the BTAC, which reduces the effective size of the BTAC;
(2) A group of instructions that do not have any "taken" branches will incur a fetch penalty the first time it is fetched; and
(3) The fact that the data out of the BTAC must feed back to the BTAC and the instruction cache causes some cycle time problems in very high frequency designs.

As a result of the foregoing, there is a need in the art for an improved BTAC design.

SUMMARY OF THE INVENTION

The present invention addresses the foregoing needs by implementing a two-cycle BTAC where the BTAC function is pipelined over two cycles. For a block of instructions, the two-cycle BTAC stores the target address of branches that are in the next block, instead of the address of the next block. The result is that the BTAC has the address of the block that follows the next block instead of the address of the next block. By having the BTAC be a two-cycle BTAC, there is enough time to do a directory compare to determine if a hit is occurring in the BTAC. If a hit does not occur, then the sequential address is fed into the instruction cache and the BTAC. Using a two-cycle BTAC solves the three problems noted above with one-cycle high frequency BTAC's.

The two-cycle BTAC will read two entries each time it is accessed, a sequential and a non-sequential entry. The sequential entry is used when the instruction that is being fetched with the BTAC entry has no "taken" branch predictions. The non-sequential entry is used when the instructions that are being fetched with the BTAC entry expects to have a "taken" branch. Because of the pipelined nature of the BTAC, it is always known when a branch is being fetched whether the branch will be predicted "taken" or "not taken". When a branch is re-directed, the re-direction address is known from the normal branch processing function: the information that was not selected during fetch would be used the cycle after the re-direction (sequential if non-sequential is initially predicted, non-sequential if sequential is initially predicted).

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a microprocessor configured in accordance with the present invention;

FIGS. 3, 3A, and 3B illustrates further detail of a branch processing unit configured in accordance with the present invention;

FIGS. 4, 4A, and 4B illustrates a BTAC configured in accordance with the present invention;

DETAILED DESCRIPTION

Figure 1:
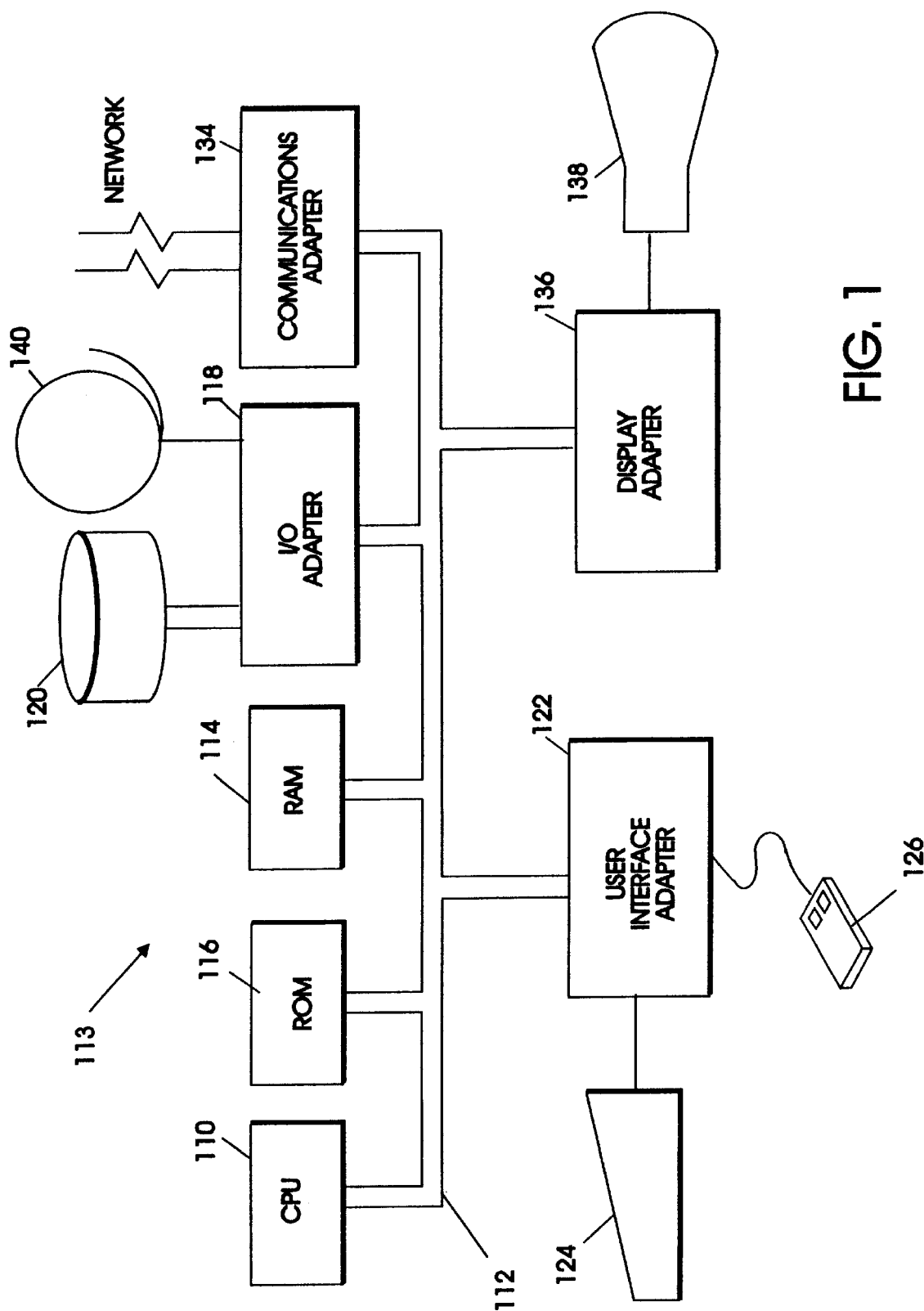
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 113 configurable in accordance with the present invention. The CPU 110 is coupled to various other components by system bus 112. Read only memory ("ROM") 116 is coupled to the system bus 112 and includes a basic input/output system ("BIOS"), which controls certain basic functions of the data processing system. Random access memory ("RAM") 114, I/O adapter 118, and communications adapter 134 are also coupled to the system bus 112. I/O adapter 118 may be a small computer system interface ("SCSI") adapter that communicates with a disk storage device 120 or tape storage drive 140. I/O adapter 118, disk storage device 120, and tape storage device 140 are also referred to herein as mass storage 252 (see FIG. 2). Communications adapter 134 interconnects bus 112 with an outside network enabling the data processing system 113 to communicate with other such systems. Input/output devices are also connected to system bus 112 via user interface adapter 122 and display adapter 136. Keyboard 124 and mouse 126 are interconnected to bus 112 via user interface adapter 122. Display monitor 138 is connected to system bus 112 by display adapter 136. In this manner, a user is capable of inputting to the system 113 through keyboard 124 or mouse 126 and receiving output from the system 113 via speaker 128 and display 138.

With reference now to FIG. 2, there is depicted a block diagram of an illustrative embodiment of CPU 110 for processing information in accordance with the invention recited within the appended claims. In the depicted illustrative embodiment, CPU 110 comprises a single integrated circuit superscalar microprocessor. Accordingly, as discussed further below, CPU 110 includes various execution units, registers, buffers, memories, and other functional units, which are all formed by integrated circuitry. CPU 110 is coupled to system bus 112 via bus interface unit (BIU) 212 and processor bus 213, which like system bus 112 includes address, data, and control buses. BIU 212 controls the transfer of information between processor 210 and other devices coupled to system bus 112, such as nonvolatile mass storage 252, by participating in bus arbitration. CPU 110 illustrated in FIG. 2 may include other unillustrated devices coupled to system bus 112, which are not necessary for an understanding of the following description and are accordingly omitted for the sake of simplicity.

BIU 212 is connected to instruction cache (Icache) and MMU (Memory Management Unit) 214 and data cache and MMU 216 within CPU 110. High-speed caches, such as those within instruction cache and MMU 214 and data cache and MMU 216, enable CPU 110 to achieve relatively fast access times to a subset of data or instructions previously transferred from main memory to the caches, thus improving the speed of operation of the data processing system 113. Data and instructions stored within the data cache 216 and instruction cache 214, respectively, are identified and accessed by address tags, which each comprise a selected number of high-order bits of the physical address of the data or instructions.

Instruction cache and MMU 214 is further coupled to instruction fetch unit ("IFU") 217, which fetches groups of instructions for execution during each cycle. IFU 217 transmits branch instructions to branch processing unit ("BPU") 218 for execution, but temporarily stores instructions within instruction queue 219 for execution by other execution circuitry within CPU 110. The IFAR (instruction fetch address register) 311 is a register (see FIG. 3) in the IFU 217 that holds the instruction address that is accessing the Icache 214.

In the depicted illustrative embodiment, in addition to BPU 218, the execution circuitry of CPU 110 comprises multiple execution units for executing sequential instructions, including fixed-point unit ("FXU") 222, load/store unit ("LSU") 228, and floating-point unit ("FPU") 230. Each of execution units 222, 228 and 230 typically executes one or more instructions of a particular type of sequential instructions during each processor cycle. For example, FXU 222 performs fixed-point mathematical and logical operations such as addition, subtraction, ANDing, ORing, and XORing, utilizing source operands received from specified general purpose registers ("GPRs") 232. Following the execution of a fixed-point instruction, FXU 222 outputs the data results of the instruction to GPR buffers 232, which provide storage for the result received on result bus 262. Conversely, FPU 230 typically performs single and double-precision floating-point arithmetic and logical operations, such as floating-point multiplication and division, on source operands received from floating-point registers ("FPRs") 236. FPU 230 outputs data resulting from the execution of floating-point instructions to selected FPR buffers 236, which store the result data. As its name implies, LSU 228 typically executes floating-point and fixed-point instructions which either load data from memory (i.e., either the data cache within data cache and MMU 216 or mass storage 252) into selected GPRs 232 or FPRs 236 or which store data from a selected one of GPRs 232 or FPRs 236 to memory.

CPU 110 employs both pipelining and out-of-order execution of instructions to further improve the performance of its superscalar architecture. Accordingly, instructions can be executed by FXU 222, LSU 228, and FPU 230 in any order as long as data dependencies are observed. In addition, instructions are processed by each of FXU 222, LSU 228, and FPU 230 at a sequence of pipeline stages. As is typical of high-performance processors, each sequential instruction is processed at five distinct pipeline stages, namely, fetch, decode/dispatch, execute, finish, and completion.

Instructions fetched are stored by IFU 217 within instruction queue 219. In contrast, IFU 217 removes (folds out) branch instructions from the instruction stream and forwards them to BPU 218 for execution.

During the decode/dispatch stage, dispatch unit 220 decodes and dispatches one or more instructions from instruction queue 219 to execution units 222, 228, and 230, typically in program order. In a more conventional processor, dispatch unit 220 allocates a rename buffer within GPR rename buffers 233 or FPR rename buffers 237 for each dispatched instruction's result data, and at dispatch, instructions are also stored within the multiple-slot completion buffer of completion unit 240 to await completion. However, the present invention is adaptable to embodiments which require neither rename registers or completion units. According to the depicted illustrative embodiment, CPU 110 tracks the program order of the dispatched instructions during out-of-order execution utilizing unique instruction identifiers.

During the execute stage, execution units 222, 228, and 230 execute instructions received from dispatch unit 220 opportunistically as operands and execution resources for the indicated operations become available. In one embodiment, each of execution units 222, 228, and 230 are equipped with a reservation station that stores instructions dispatched to that execution unit until operands or execution resources become available. After execution of an instruction has terminated, execution units 222, 228, and 230 store data results, if any, within either GPRs or FPRs, depending upon the instruction type. In more conventional processors, execution units 222, 228, and 230 notify completion unit 240 which instructions have finished execution. Finally, instructions are completed in program order out of the completion buffer of completion unit 240. Instructions executed by FXU 222 and FPU 230 are completed by transferring data results of the instructions from GPR rename buffers 233 and FPR rename buffers 237 to GPRs 232 and FPRs 236, respectively.

Figures 3, 3B:
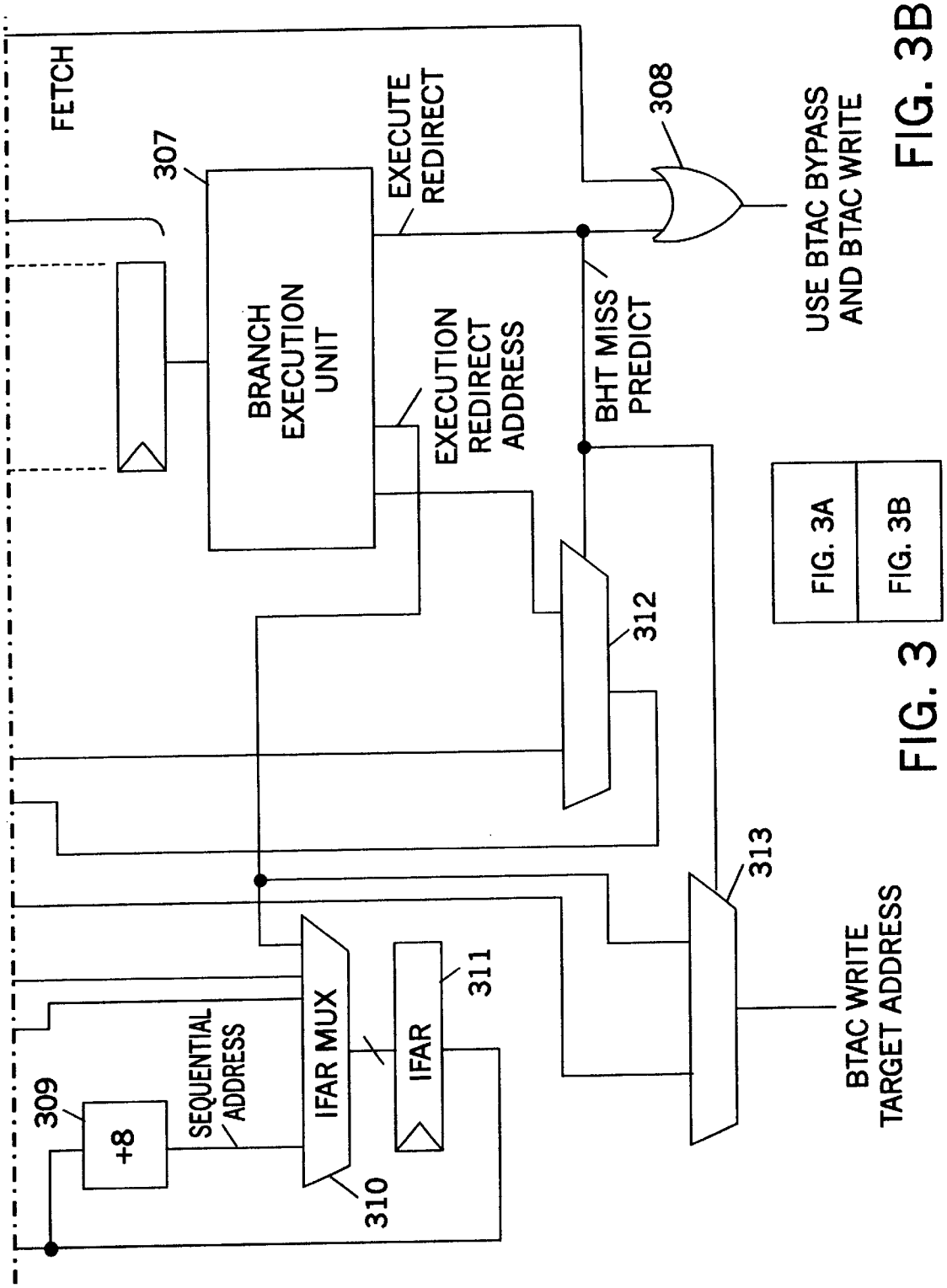
Figure 4A:
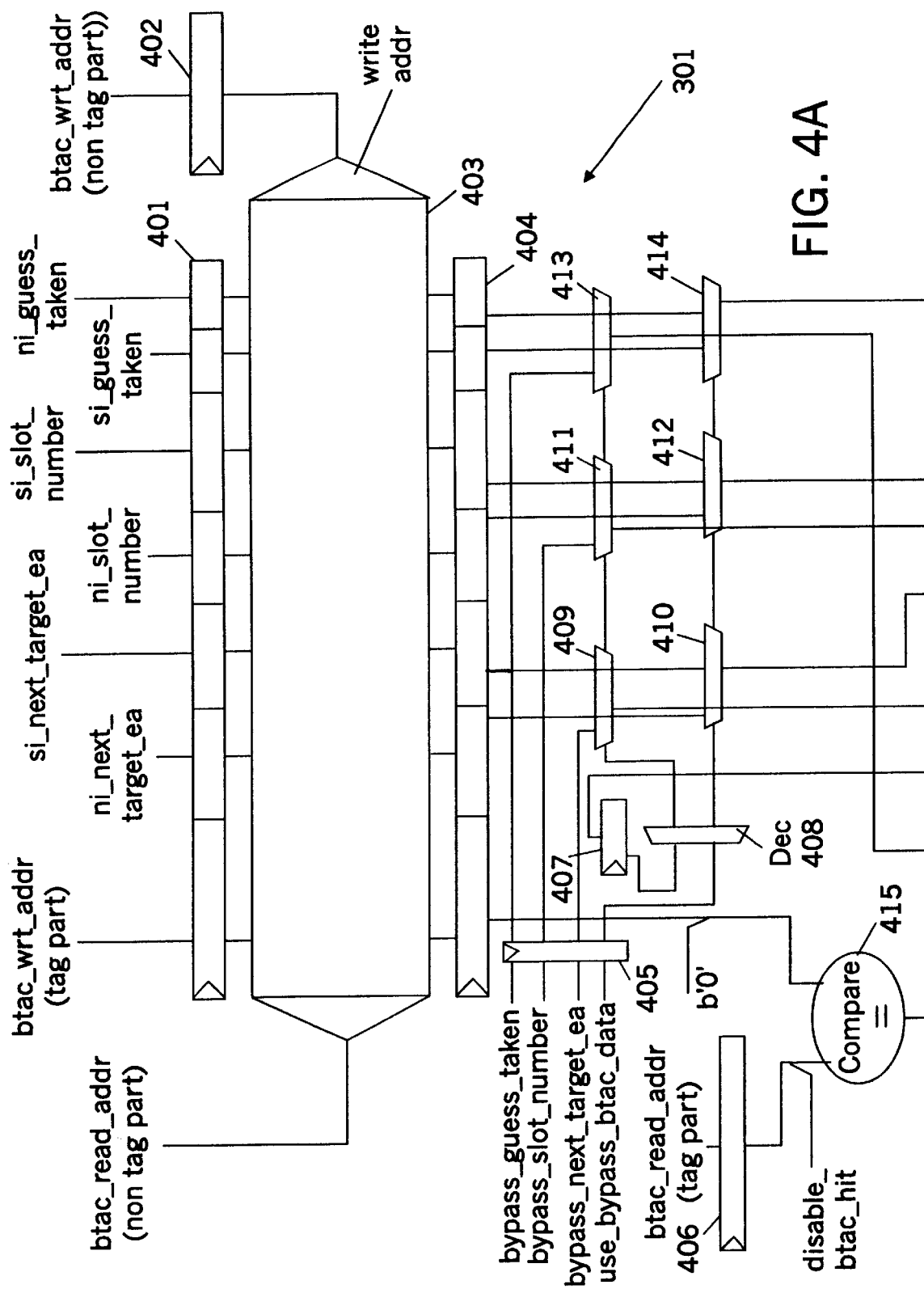

Referring next to FIG. 3, there is illustrated more detail of branch processing unit 218 connected to IFU 217 and Icache 214. A group of eight instructions (note that the present invention is applicable to the fetching of any number of instructions within a group) is fetched by IFU 217 and stored in IFAR 311. The eight instructions are sent in parallel to Icache 214, branch history table ("BHT") 302, and branch calculator and predictor logic 305. The address for the fetched group is sent to BTAC 301. Reference will now be made to FIG. 4 for further discussion of BTAC 301. The discussion will then subsequently return to FIG. 3.

The instruction group address, noted as btac_read_addr (non-tag part), is received as the read address (addr) and compared to the entries within BTAC array 403. The tag portion of btac_read_addr is received by register 406 and compared by comparator 415 to the tag portion of the entries within array 403 to determine if there is a hit in the BTAC 301. If there is a hit, then the various entries associated with that address are latched through register 404.

Note, the disable_btac hit signal is an externally provided (e.g., from software running in the CPU 110) mode control signal that can disable the functionality of the BTAC 301. The b'0' signal refers to binary zero.

Furthermore, the taken bits stored and corresponding to the sequential and non-sequential addresses (si_guess_taken and ni_guess_taken) will be inputted into multiplexers 413 and 414.

A bypass address, bypass_next_target_ea, is also received at register 405 along with its predictor values. For example, the slot number associated with this address, bypass_slot_number, is received by register 405, along with the taken bit, bypass_guess_taken. A signal that is asserted when the bypass information is to be used, use bypass_btac_data, is received by register 405 and provided to decoder 408, which also receives a bit from register 407, which receives the bit from AND gate 416. When the comparator 415 produces a BTAC miss, then the output of AND gate 416 will be 0, which will be passed to decoder 408. Otherwise, when there is a BTAC hit, the output of AND gate 416 is dependent upon the selection within multiplexer 413.

If the use bypass bit (use_bypass_btac_data) is asserted, then the value from AND gate 416 is a "don't care." Decoder 408 will then force multiplexers 409, 411, and 413 to select the bypass information (bypass_next_target_ea, bypass_slot_number, bypass_guess_taken, respectively) to be output.

Otherwise, selection from multiplexers 409, 411, and 413 is dependent upon the value from AND gate 416, which is a high signal if there is a hit in the BTAC array 403 and the predictor associated with the entry indicates that the branch is taken. The output from decoder 408 when the bypass information is not to be used determines whether the sequential or non-sequential target address is to be output as the primary address, while the not-taken branch will be output as the alternate data. The alternate address, ao_next_target_ea, is latched into register 417, the alternate slot number, ao_slot_number, is latched into register 418, while the alternate taken bit, ao_guess_taken, is latched into register 419. Further discussion of this alternate information will be provided below with respect to FIG. 3.

The primary target address, po_next_target_ea, is provided to multiplexer 421. Multiplexer 421 also receives the incremented address from next address incrementer 420, which increments the address received from the IFAR by how ever many instructions are fetched at a time (e.g., eight). Output of multiplexer 421 is dependent upon the output of the AND gate 416. If there is a BTAC hit, then the primary target address, po_next_target_ea, will be output from multiplexer 421, otherwise the address from incrementer 420 will be output meaning that there was no predicted address to fetch from an entry in array 403.

Decoder 422 is a 3:8 decoder, which receives the slot number of the primary target address, po_slot_number, received from multiplexer 411 and the output from AND gate 416. The output of decoder 422 is latched through register 433. Decoder 422 determines which instruction in the group of eight has a branch predicted taken (if any). This vector will be compared to the BHT 302 predictions to determine if there is a discrepancy. If there is, then the BHT prediction is used.

Writing into array 403 is performed through registers 401 and 402 in a manner corresponding to how information is read from array 403 as discussed above.

Returning now to FIG. 3, there will follow a discussion of an operation of BTAC 301 along with Icache 214 and BHT 302 in accordance with the present invention. The address from IFAR 311 is sent to BTAC 301, Icache 214, BHT 302, and register 314. As a result, eight instructions are transmitted from Icache 214 through register 303 to branch calculator and predictor logic 305. BHT 302 produces and sends eight predictors, or predictions, for the eight instructions through register 304 to logic 305. BTAC 301 sends the alternate target information and associated predictors (ao_next_target_ea from register 417, ao_slot_number from register 418, ao_guess_taken from register 419) to logic 305. The eight instructions from IFAR 311 are transferred to logic 305 through register 314 for timing purposes. Branch calculator and predictor logic 305 architecturally calculates the actual target addresses of the eight instructions. This may be done sequentially or in parallel.

Branch calculator and predictor logic 305 compares the predictors from latch 433 and BTAC 301 with the predictors from BHT 302 to look for discrepancies between these two vectors. The first discrepancy will notify which of the instructions was predicted incorrectly, which allows the logic 305 to figure out which of the target predictions to select or which of the sequential addresses to predict. The branch calculator and predictor logic 305 utilizes an incrementer (not shown) to calculate sequential addresses for the eight instructions. Therefore, for each of the eight instructions, logic 305 calculates a sequential address and a target address. As an example, if the BTAC 301 predicted taken for an instruction and the BHT 302 predicted not taken, then logic 305 would select the sequential address, and in vice versa, then the target would be selected. If an address was not predicted correctly, then the corrected address information is passed into pipeline stages 306 (pipeline stages 306 represent that there is a delay between branch prediction and branch execution) and then eventually is read out into branch execution unit 307, which retrieves other information from the rest of the system to figure out if the branch instruction was predicted correctly or not. The All Branch Information passed from logic 305 to pipeline steps 306 is utilized to interpret the branch and to determine if the branch is correct and fix it if it was wrong. If the branch instruction was mispredicted, then the address out of unit 307 is put into IFAR mux 310, which is controlled by the execute redirect signal into OR gate 308 (mux 421 is part of mux 310).

Unit 307 receives the condition register results to determine which branch the branch instruction should have taken, and will cause a redirect if the prediction is incorrect. This will result in an updating of BTAC 301 and BHT 302. The execution redirect address is validated by the execute direct signals, which control muxes 312 and 313. The fetch and execute redirect signals to OR gate 308 determine if the bypass information is used. The output of OR gate 308 is passed to decoder 408 through latch 405.

Multiplexer 312 muxes either the addresses from the execute redirect address calculated in the branch execution unit 307 or the BHT redirect address and returns that back to the BTAC 301, which is going to be the bypass address. Therefore, if there is an execution redirect address, then that is what is going to be used in terms of a bypass to the BTAC 301. This bypass data is sent to latch 405.

If there was at the same cycle both a BHT mispredict and a fetch mispredict, the BHT mispredict will win out, since the BHT mispredict is "older".

Figure 5:
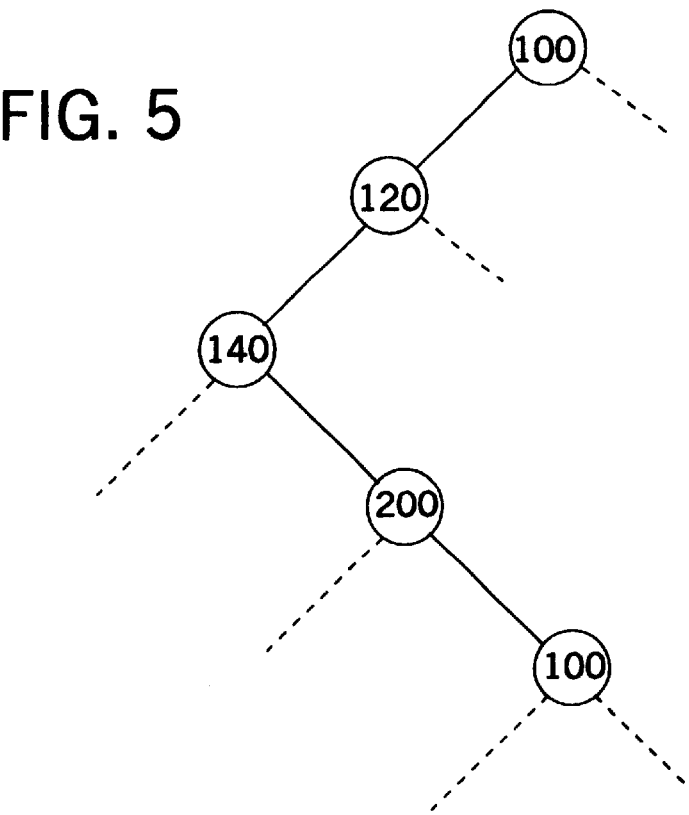
FIG. 5 illustrates the topology of a first example implemented with the BTAC of the present invention.

Referring now to FIG. 5, there is illustrated a topological example of how such branch instructions are stored within the BTAC 301. In this example, the left legs of (down and to the left) the tree reflect "not taken" branches, while the right legs (down and to the right) reflect "taken" branches. In this example there are two branches that are always taken. The example will start off with a "warmed up" BTAC and then the example will show how to get to this "warmed up" state. The code stream in this example is as follows:

| | |
|---|---|
| 100 | 8 non-branch instructions |
| 120 | 8 non-branch instructions |
| 140 | branch to 200 |
| 200 | branch to 100 |

Within the following tables, blank fields designate fields that do not contribute to the result, each line represents a single cycle, and the data in each line represents the data that is available to that cycle. In the case of the BTAC data, the data shown was read the previous cycle or "stuffed" into the pipeline after a re-direct operation. Additionally, in the tables, the previous predict field is used to determine which of the BTAC fields is selected as the primary BTAC data and which is selected as the alternate BTAC data. Furthermore, the primary BTAC data is what is used to select the next set of instructions to fetch to the IFAR.

TABLE 1

Steady State Fetch Prediction

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 100 | no | | | | | sequential | |
| 120 | no | 100 | | | | sequential | |
| 140 | yes | 120 | not taken | taken (200) | | taken (200) | |
| 200 | yes | 140 | taken | | taken (100) | taken (100) | |
| 100 | no | 200 | | | | sequential | |

TABLE 2

Steady State BTAC Content

| Address (including tag) | BTAC Sequential Predict | BTAC Non-Sequential Predict |
|---|---|---|
| 120 | taken (200) | sequential |
| 140 | sequential | taken (100) |

TABLE 3

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 100 | no | | | | | sequential | |
| 120 | no | 100 | | | | sequential | |
| 140 | no | 120 | not taken | | | sequential | |
| 160 | no | 140 | not taken | | | sequential | sequential |

Table 3 begins to show how the BTAC gets to the initial steady state shown in Tables 1 and 2. The branch at 140 is miss-predicted, so a BTAC entry is created at the previous entry (120). Since 120 was predicted not taken, a write is performed into 120's sequential section. Since 140 is predicted as taken to 200, a "predicted taken" is written to the target address 200. Since this entry is being created from a BTAC miss, the taken part of 120's BTAC entry is written to predict sequential. See Table 4.

Because BTAC entry 140 was a miss, the alternate branch after 140 is redirected as sequential. If 140 had been a BTAC hit, then the alternate BTAC information would have come from the target part of the 140 BTAC entry and would have been used to stuff the pipeline on the cycle after the redirect.

TABLE 4

| Address (including tag) | BTAC Sequential Predict | BTAC Non-Sequential Predict |
|---|---|---|
| 120 | taken (200) | sequential |

TABLE 5

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 200 | forced | | | | | sequential (stuffed) | sequential (stuffed) |
| 220 | no | | Force (0) | | | sequential | |

Again, the BTAC is wrong, so the system writes into the previous address for the 200 branch which is 140. Since 140 was predicted taken, the process writes into 140's non-sequential section. The BTAC is now in the steady state for this example.

TABLE 6

| Address (including tag) | BTAC Sequential Predict | BTAC Non-Sequential Predict |
|---|---|---|
| 120 | taken (200) | sequential |
| 140 | sequential | taken (100) |

Figure 6:
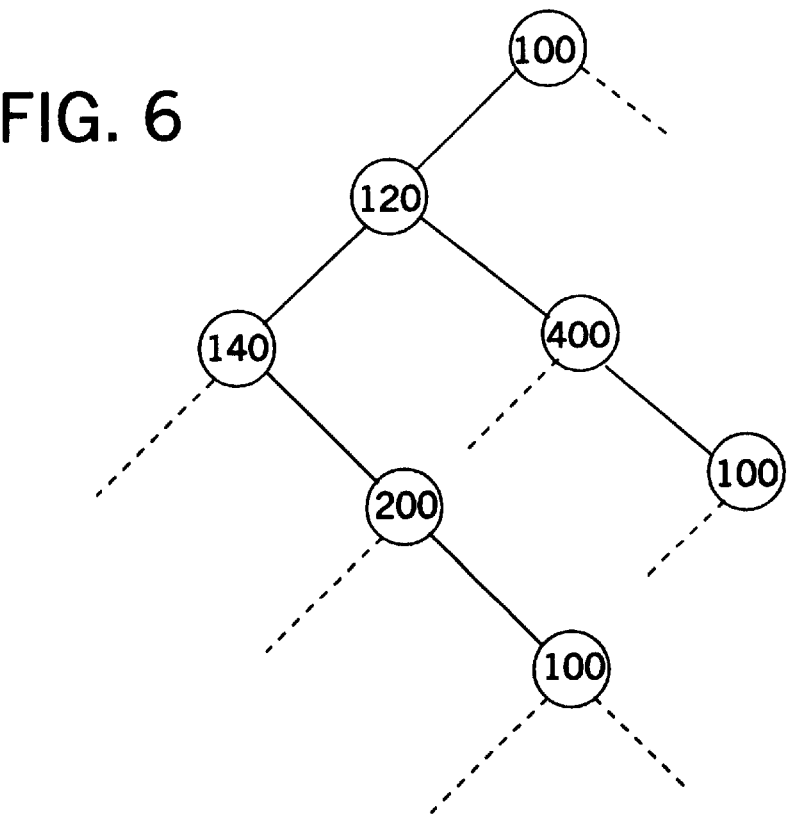
FIG. 6 illustrates the topology of a second example implemented with the BTAC of the present invention.

Referring next to FIG. 6, a second example will now be provided, which begins where the first example left off, except that instead of 120 containing all non-branch instructions, 120 now contains a conditional branch that is sometimes taken. The conditional branch that is sometimes taken will proceed to 400, which then branches to 100. The code sequence is as follows:

| 100 | 8 non-branch instructions |
| 120 | branch conditional to 400 |
| 140 | branch to 200 |
| 200 | branch to 100 |
| 400 | branch to 100 |

The example starts with 140 being taken; therefore, the BTAC state is the same state as in example 1, Table 2:

TABLE 7

| Address (including tag) | BTAC Sequential Predict | BTAC Non-Sequential Predict |
|---|---|---|
| 120 | taken (200) | sequential |

TABLE 7-continued

| Address (including tag) | BTAC Sequential Predict | BTAC Non-Sequential Predict |
|---|---|---|
| 140 | sequential | taken (100) |

TABLE 8

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 100 | no | 200 | | | | sequential | |
| 120 | no | 100 | not taken | | | sequential | |
| 140 | no | 120 | not taken | taken (200) | sequential | taken (200) | sequential |

120 was predicted to be not taken but re-directed to be taken. 100 is the previous address, and it was not taken so the process writes to the sequential part of 100.

TABLE 9

| Address (including tag) | BTAC Sequential Predict | BTAC Non-Sequential Predict |
|---|---|---|
| 100 | taken (400) | sequential |
| 120 | taken (200) | sequential |
| 140 | sequential | taken (100) |

TABLE 10

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 400 | force | 120 | | | | sequential | sequential |
| 420 | no | 400 | force 0 | | | sequential | sequential |

The processor re-directs on the branch at 400. The previous address is 120 and since 120 was taken, the processor writes to the non-sequential part of 120.

TABLE 11

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 100 | force | 400 | | | | sequential | sequential |
| 120 | yes | 100 | force 0 | taken (400) | sequential | taken (400) | sequential |
| 400 | yes | 120 | taken | taken (200) | taken (100) | taken (100) | taken (200) |

This time 120 is predicted as taken to 400. However, assume that this time around 120 is not taken. 120 is redirected to sequential. The alternate BTAC data indicates taken to 200, so on the cycle after the re-direction, the BTAC mechanism will predict a branch to 200.

TABLE 12

| IFAR | BTAC Hit | Previous IFAR | Previous Predict | BTAC Sequential Predict | BTAC Non-Sequential Predict | Primary BTAC Predict | Alternate BTAC Predict |
|---|---|---|---|---|---|---|---|
| 140 | force | 120 | | | | taken (200) | taken (100) |
| 200 | yes | 140 | force 1 | sequential | taken (100) | taken (100) | sequential |

An alternative to the present invention is to reset the other predictor when a target is written to the BTAC. Instead of storing two target addresses and two slots, this can be reduced to one. If a target is written to the non-sequential part of the BTAC and the sequential predictor currently predicts a taken branch, then the predictor is reset. This reduces the accuracy of the BTAC prediction somewhat but results in an area savings. The result is that the BTAC will not do as well as some branches whose predictions tend to change more frequently.

Although the present invention and its advantages have been described in detail, it should be understood that various changes, substitutions and alterations can be made herein without departing from the spirit and scope of the invention as defined by the appended claims.

What is claimed is:

1. In a data processing system, a method comprising the steps of:

storing an entry associated with a first block of fetched instructions in a BTAC;

storing with the BTAC entry a target address of a branch instruction that resides in a second block of instructions sequential to the first block of instructions;

determining if there is a hit in the BTAC;

if there is a hit, then fetching a block of instructions addressed by the target address; and if there is not a hit, then fetching a sequential block of instructions.

2. The method as recited in claim 1, further comprising the step of re-directing fetching of instructions if it is determined that a prediction associated with the target address was incorrect.

3. The method as recited in claim 2, further comprising the step of storing a sequential address and a non-sequential address with the BTAC entry.

4. The method as recited in claim 3, wherein the re-directing step further comprises the steps of:

if the BTAC entry predicts that the target address is taken, and it is determined that this prediction is incorrect, then the re-direct fetches instructions using the sequential address; and if the BTAC entry predicts that the target address is not taken, and it is determined that this prediction is incorrect, then the re-direct fetches instructions using the non-sequential address.

5. A branch target address cache ("BTAC") comprising:

circuitry for storing an entry in the BTAC associated with a first block of fetched instructions; and circuitry for storing, in association with the first block of fetched instructions, a target address of a branch instruction residing in a next block of fetched instructions.

6. The BTAC as recited in claim 1, wherein the next block of fetched instructions are sequential relative to the first block of fetched instructions.

7. The BTAC as recited in claim 6, wherein the target address includes a sequential and non-sequential address.

8. The BTAC as recited in claim 7, further comprising circuitry for predicting whether the sequential or non-sequential address will be taken.

9. The BTAC as recited in claim 8, further comprising circuitry for re-directing fetching of instructions if the prediction was incorrect.

10. A processor comprising:

a bus interface unit operable for coupling to a bus that is coupled to a memory storage;

an instruction cache coupled to the bus interface unit;

an instruction fetch unit coupled to the instruction cache; and and a branch processing unit coupled to the instruction fetch unit operable for processing branch instructions, wherein the branch processing unit further comprises:

a BTAC operable for storing an entry associated with a first block of instructions, wherein the entry includes a target address of a branch instruction residing in a second block of instructions sequential to the first block of instructions.

11. The processor as recited in claim 10, wherein the entry includes a sequential address associated with the branch instruction.

12. The processor as recited in claim 11, wherein the entry includes a prediction if the target address is taken or not taken.

13. The process as recited in claim 12, wherein the BTAC includes circuitry for determining if there is a hit with the entry.

14. The process as recited in claim 13, wherein the BTAC includes circuitry for selecting the target address if there is a hit and the prediction is taken.

15. The process as recited in claim 14, wherein a sequential address is used to fetch a next block of instructions by the instruction fetch unit if there is not a hit in the BTAC.

16. The process as recited in claim 15, wherein the sequential address is used to fetch the next block of instructions by the instruction fetch unit if the prediction is not taken.

* * * * *

UNITED STATES PATENT AND TRADEMARK OFFICE
CERTIFICATE OF CORRECTION

PATENT NO. : 6,279,105 B1
DATED : August 21, 2001
INVENTOR(S) : Brian R. Konigsburg and David Stephen Levitan It is certified that error appears in the above-identified patent and that said Letters Patent is hereby corrected as shown below:

<u>Column 13,</u>
Line 31, "1" should be -- 5 --.

Signed and Sealed this

Fourteenth Day of May, 2002

*Attest:*

JAMES E. ROGAN
*Attesting Officer*  *Director of the United States Patent and Trademark Office*